March 3, 1959 J. F. CAMPBELL 2,875,779
VARIABLE AREA METERING VALVE
Filed Feb. 8, 1954 2 Sheets-Sheet 1
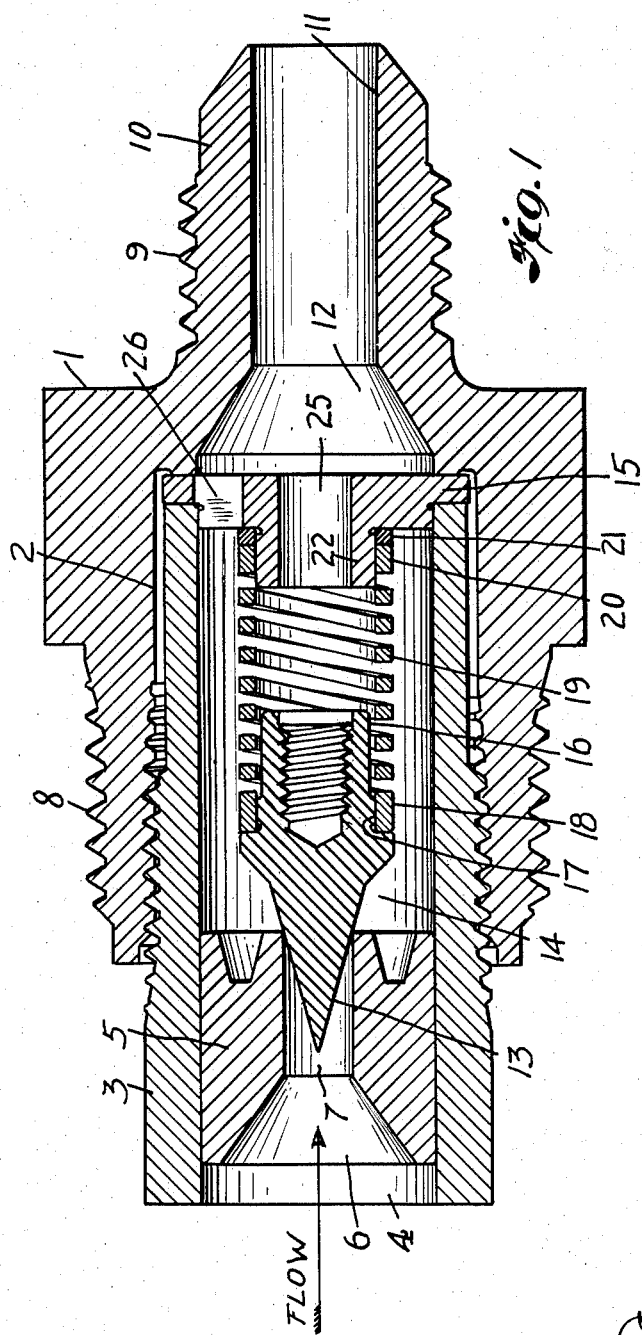
Fig. 1
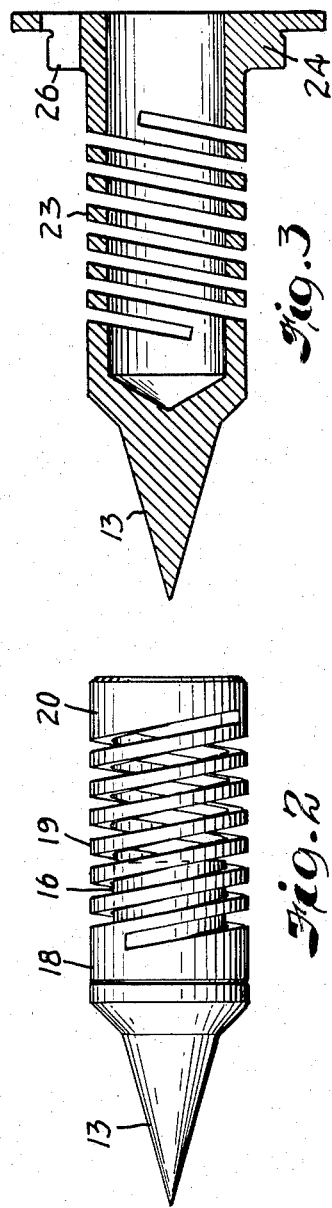
Fig. 3
Fig. 2
INVENTOR.
JOHN F. CAMPBELL
BY
Oberlin & Limbach
ATTORNEYS.

March 3, 1959 J. F. CAMPBELL 2,875,779
VARIABLE AREA METERING VALVE
Filed Feb. 8, 1954 2 Sheets-Sheet 2
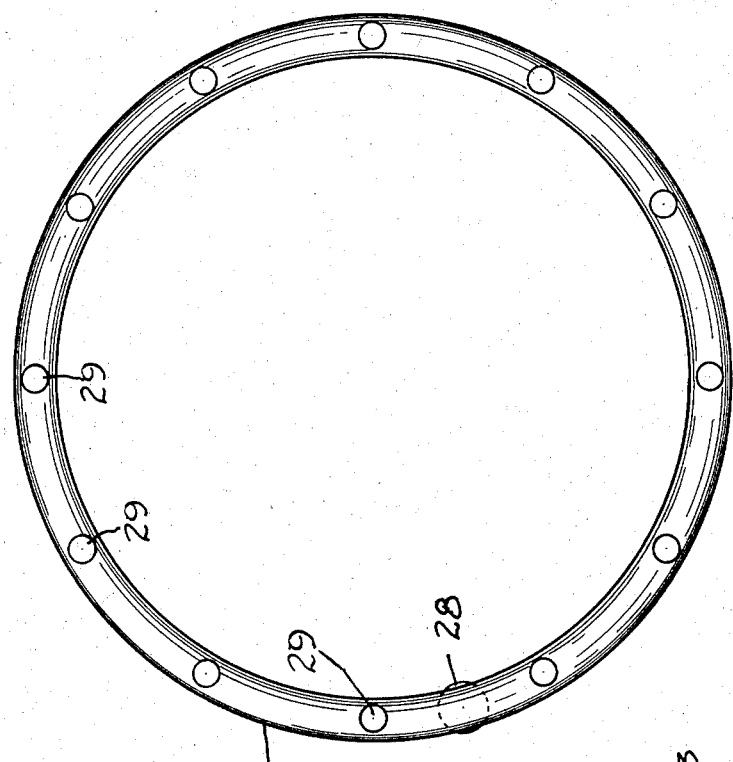
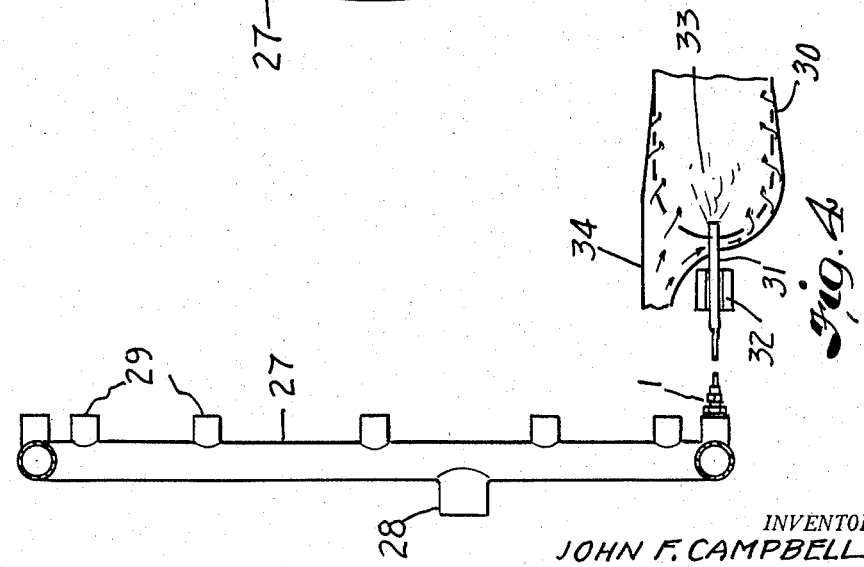
INVENTOR.
JOHN F. CAMPBELL
BY
Oberlin & Limbach
ATTORNEYS.

United States Patent Office 2,875,779
Patented Mar. 3, 1959

2,875,779

VARIABLE AREA METERING VALVE

John F. Campbell, Euclid, Ohio

Application February 8, 1954, Serial No. 408,935

3 Claims. (Cl. 137—529)

This invention relates as indicated to a variable area metering valve, and more particularly to a valve of this type having unusually uniform and reliable performance characteristics.

Variable area metering valves are employed for many purposes where it is desired that fluid flow be initiated upon the attaining of a certain minimum pressure with such flow increasing at a desired rate as the pressure increases. Various forms of metering valves are known, an important type utilizing a spring-backed axially reciprocable valve member normally engaging in the valve opening or passage and with either or both such member and passage contoured to afford selected rates of flow at various stages in the opening movement of the valve member. Valves of this general type have tended to be rather expensive of manufacture and not too uniform and reliable in their action due to frictional engagement of moving parts and unequal action of the spring biasing the valve member.

It is accordingly a principal object of my invention to provide a variable area metering valve which will be effective to maintain a very accurate alignment of the metering valve member or needle relative to its seat.

A further object is to provide such valve capable of large-scale production with a high degree of uniformity so that performance may be obtained closely consistent within a few percent of a master program of flow rate versus operating pressure.

Another object is to provide such valve in which the needle valve member is mechanically centered, hydraulically centered and supported against the application of hydraulic force thereon in a manner stabilizing the action of the same.

Fuel utilized in present-day gas turbine and ram-jet propulsion units is conveyed in a manifold which usually encircles the combustion section. Branch conduits are employed to transfer fuel from the supply manifold to a multitude of combustion chambers or combustion zones in one chamber. It is essential to maintain uniformity of flow rate between the branch conduits to achieve combustion temperatures which are uniform within safe operating limits. An increase of flow rate in one branch greater than approximately 10% of the average in all the branches will result in a combustion temperature sufficiently high severely to damage the elements of the combustion zone associated with that branch. A maximum fuel flow deviation of 4% is normally all that is tolerated.

Some propulsion units are designed to utilize several feet of vaporizer tube in each branch leading from the supply manifold. With this arrangement, the vaporizer tube replaces the fuel spray nozzle employed in the usual systems. Fuel is ordinarily introduced into the vaporizer tube through one or more supply jets and/or simple orifices whose combined area, per vaporizer tube, is sufficiently large to avoid excessive operating pressures. It may ordinarily be desired that the maximum manifold pressure should not exceed 400 p. s. i. at 100% fuel flow rate.

It is at present considered essential to operate such propulsion units, from minimum to maximum flow rate, over a range of 1 to 30. Very probably certain units in the near future will require a range of flow rate of approximately 1 to 125. Assuming the orifice-vaporizer tube system to operate at 400 p. s. i. at 100% flow, the pressure at 3.3% flow will be .44 p. s. i. and .025 p. s. i. at 0.8% flow. These pressures are equivalent to vertical fuel columns of 16 inches and .9 inch respectively. Since vertical distances between low and high branch outlets are usually something greater than 24 inches, it will be realized that fuel will feed only from the lowest outlets at low flow rates. This condition is further aggravated by forces imposed in flight during which magnitudes up to 40 times the normal gravitational pull may be encountered.

It is accordingly still another object of my invention to provide a fuel supply system for gas turbine and ram-jet propulsion units and the like which will overcome the above-mentioned difficulties and ensure the proper supply of fuel to all combustion units under all operating conditions.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal sectional view through a variable area metering valve embodying the principles of my invention;

Fig. 2 is a side view of the valve needle and associated compression spring;

Fig. 3 is a longitudinal sectional view through a modified form of such valve needle with the spring integral therewith;

Fig. 4 is a semi-diagrammatic view of a manifold for distributing fuel to the combustion chamber or combustion zones of a gas turbine or ram-jet propulsion unit; and Fig. 5 is a plan view of such manifold.

Referring now more particularly to said drawing and especially Figs. 1-3 thereof, the emboidment of my invention there illustrated comprises a valve body member 1 having a cylindrical interior 2 and threadedly engaging an inner liner 3. Such liner has a cylindrical interior 4 near the outer end of which is press-fitted a valve seat member 5 having a tapering or frusto-conical entry port 6 leading to a central cylindrical passage 7. Valve body 1 is externally threaded at 8 and also at 9 on reduced axial extension 10 for incorporation in a fuel line or the like. Such extension 10 has a central longitudinally extending passage 11 therethrough with a widening inner end portion 12 opening to the interior of the valve body.

A valve needle 13 is located within chamber 14 defined by the inner cylindrical surface 4 of liner 3, valve seat member 5, and spring pilot member 15 seated against valve body 1 and held firmly in position by the end of liner 3. Valve needle 13 includes a cylindrical axial extension 16 having a carefully ground land 17 closely fitted within the end 18 of a unitary multicoil spring 19. The other end 20 of such spring is supported gainst pilot member 15 with an appropriate shim 21 being interposed therebetween to obtain the desired degree of compression of such spring biasing needle 13 against its seat in member 5.

The end 20 of spring 19 is ground closely to fit the true outer cylindrical surface of extension 22 of seat member 15 so that such spring is exactly aligned with cylindrical passage 7. Due to the fact that the two ends 18 and 20 of spring 19 define complete cylinders and are themselves integral with the two coils of spring 19 (which are joined to such ends at diametrically opposite points), there is no tendency of such spring to cant as it is compressed or extended, and accordingly needle 13 is mechanically supported in a manner to ensure direct axial reciprocation of the same without the necessity of employing additional lateral guide means therefor. The elimination of such guide means avoids one source of friction, insensitivity, and sticking.

As shown in Fig. 3, the valve member 13 may also be formed integrally with the spring 23 biasing the same and the spring may in turn be formed integrally with the seat 24. Obviously this construction eliminates the necessity for several grinding and fitting operations and is desirable for large-scale manufacture.

As the needle 13 is reciprocated under the action of increasing fluid pressure in passage 7, the fluid enters chamber 14 and passing between the turns of spring 19, escapes through central passage 25 to the outlet passage 11. Obviously as the valve opens to an increasing extent, the turns of the spring will move more closely together, somewhat restricting the flow to such central passage 25, and accordingly a plurality of evenly spaced passages such as 26 are provided in the flange 24 of pilot member 15 radially outwardly of the spring to ensure that fluid flow through the valve will not be unduly restricted but will be directly determined by the degree of reciprocation of needle 13 relative to its seat in passage 7 and the relative contours of such needle and passage.

The spring element or portion of Figs. 1–3 inclusive is shown as comprising two interleaved coils joining with the integral solid end portions at diametrically opposite points. A larger number of similarly interleaved coils may also be employed with their ends terminating at uniformly circumferentially located points in such solid ends. Compression of such springs results in a uniform axial force on the ends thereof without any tendency toward canting. Furthermore, the solid ends 18 and 20 (Fig. 2) or the integral ends corresponding thereto (Fig. 3) are not subject to radially outward expansion under the action of compressive forces as is the case with the usual coil spring. The coil portions of my spring may conveniently be formed by a milling operation so that the turns are of generally rectangular cross-section. As above indicated, all interfitting surfaces, both circumferential and axial, are very carefully ground so that the spring and needle will be exactly axially aligned with passage 7 in valve seat 5. This, of course, means that the end faces of pilot member 15 and the opposed end of sleeve 3 must be carefully ground as indicated. The fact that the ends of the spring member are integral and solid permits reliance thereon in maintaining precise alignment of the needle, an impossibility when ordinary compression springs are employed, the ends of which tend to expand as the spring is compressed. As a result, it is possible to produce a large number of valves in accordance with my invention, on a regular production schedule, varying only within a few percent of a master program of flow rate versus operating pressure.

The particular fuel flow versus operating pressure program of the valve will be principally determined by appropriate selection of spring rate, metering needle contour, and the contour of the opposed seat.

Not only are the elements supporting the needle of a nature to maintain true axial position of the latter, but also such elements including the valve seat 5 are all mounted and centered within the cylindrical bore 4 of liner 3.

Now referring more particularly to Figs. 4 and 5 of the drawing, a ram-jet manifold 27 is there semi-diagrammatically illustrated connecting with a main fuel intake line 28 and provided with a plurality of uniformly circumferentially spaced exit ports 29 leading to respective combustion chambers such as 30. Such exit ports or bosses 29 afford mounting means for respective variable area metering valves 1 in accordance with my invention communicating with tubes 31 passing through vaporizers 32 to deliver the fuel as gas 33 in such combustion chamber. Compressed air is introduced through inlet 34 for combustion of the gas. The general arrangement of manifold, vaporizers and combustion chambers thus described is substantially conventional, the novel feature being the incorporation in the system at the points indicated of my new variable area metering valves. The springs of such valves may be preloaded as by employment of appropriate shims 21 to set a minimum manifold pressure at which the valves will open and fuel be admitted to the vaporizer tubes 31. Consequently, the manifold 27 may be kept sealed off from the branch conduits and vaporizer tubes until the manifold has filled completely with fuel. The preloading of the metering valves should be selected also to establish a manifold pressure great enough to keep the fuel contained in it from vaporizing or boiling under the most adverse conditions expected to be encountered in use. For example, a minimum operating pressure of approximately 30 p. s. i. might be selected. To avoid the development of high manifold pressures at high flow rates, the area presented by needle 13 to the inflowing fuel should be scheduled to increase with increasing manifold pressure. Thus, to achieve uniformity of flow within about 2% between the highest and lowest branch conduits and tubes, the schedule must be selected so that a change in fuel flow of 2% is accomplished by a minimum pressure change of .66 p. s. i., such minimum corresponding to a fuel column 24 inches high.

To prevent the effect of gravitational pull encountered during maneuvers from changing the flow by more than 2%, the weight of the moving parts of the valve should be less than $\frac{1}{40}$ of the force developed by .66 p. s. i. imposed on the projected area of such moving parts. An improved fuel system having the above-indicated desirable attributes may be achieved by the employment of my new variable area metering valve therein in the manner indicated.

While the needle valve member, spring element, and pilot member of the Fig. 1 embodiment are very closely and accurately fitted together, it is not necessary or ordinarily desirable to press-fit the same, preloading of the spring and hydraulic pressure in use being sufficient to hold such parts together. The inner end of the needle valve member may be drilled and tapped as shown to lighten the same and to facilitate mounting on an appropriate support during manufacture. The entire assembled valve as shown in Fig. 1 may be less than two inches in length, for example. While valve needle 13 may have various contours to achieve corresponding rate of flow programs it may ordinarily comprise an elongated conical end portion of rather high degree of taper (on the order of 15° to the axis) concentric with the axis of the passage in the seat. Within the valve chamber the needle may then flare somewhat, as shown. The shape of the components is of considerable assistance in effecting hydraulic centering of the needle relative to the seat. Not only are the hydraulic forces symmetrical relative to the needle but also such forces are exerted well within the perimeter of the spring end when the diameter of the passage through the seat is less than the outer diameter of the spring end. Of course, the inner diameters of the sleeve and of the passage through the seat should be concentric, with zero runout between the inner face of the seat and such passage.

The flaring skirt portion of valve needle member 13 may desirably be at an angle of approximately 30 degrees to the axis of the needle for best hydraulic centering thereof in use. The inner face of seat member 5 need not be relieved in the manner shown and may extend generally parallel to such skirt, if desired. When a flow vs. pressure program is desired of non-linear relationship the needle may be provided with a curved contour instead of being a true straight-sided cone as shown.

With further reference to Fig. 4, the heat input to the vaporizer element 32 may conventionally be in the form of hot compressor discharge air or combustion gases recirculated from the combustion system. In principle, such vaporizer is a heat exchanger.

Reference may be had to my co-pending applications Serial No. 351,287 filed April 27, 1953, now Patent No. 2,796,296 of June 18, 1957, and Serial No. 333,569 filed January 27, 1953, now Patent No. 2,749,182 of June 5, 1956, of which this application is a continuation-in-part, for other valve structures embodying certain broad principles of my invention.

Other modes of applying the principle of the invention may be employed, change being made as regards the details described, provided the features stated in any of the following claims or the equivalent of such be employed.

I therefore particularly point out and distinctly claim as my invention:

1. A variable area metering valve comprising an outer body member having a large bore and a smaller aligned passage therethrough forming a shoulder therebetween, an inner sleeve secured in such bore and itself having a true cylindrical bore, a valve pilot member seated against said shoulder and having a peripheral flange tightly held between the inner end of said sleeve and said shoulder, said pilot member also having a central cylindrical pilot boss protruding into said sleeve provided with an axial passage therethrough communicating with said smaller passage in said body member, said pilot member having uniformly circumferentially spaced apertures therethrough located radially outwardly of said boss and likewise leading from the interior of said sleeve to said smaller passage through said body member, a valve seat member press-fitted in said sleeve adjacent the outer end thereof, said seat member having a central passage therethrough aligned with the axis of said sleeve and boss, a valve needle member in the chamber thus defined within said sleeve between said pilot member and said seat member, said needle member having an elongated conical portion with an apex angle on the order of 30 degrees seated in the inner end of said passage in said seat member and a conical skirt portion entirely within such chamber of greater apex angle, an axial pilot boss on said needle member opposed to said boss on said pilot member, a unitary compression spring member interposed between said needle member and said pilot member having integral cylindrical end portions closely fitting said respective pilot bosses, said spring member comprising two spring coils of generally rectangular cross-section joined to said end portions at diametrically opposite points to ensure compression and extension without tendency to cant, and a shim washer interposed between said spring member and one of said members supporting the respective ends thereof to afford the desired valve seating pressure, the interfitting parts being finished to a high degree to ensure precise alignment.

2. A variable area metering valve comprising an outer body member having a large bore and a smaller aligned passage therethrough forming a shoulder therebetween, an inner sleeve secured in such bore and itself having a true cylindrical bore, a valve pilot member seated against said shoulder and having a peripheral flange tightly held between the inner end of said sleeve and said shoulder, said pilot member also having a central cylindrical pilot boss protruding into said sleeve, symmetrically arranged openings through said pilot member placing the interior of said sleeve and said passage in said body member in communication for fluid through-flow, a valve seat member press-fitted in said sleeve adjacent the outer end thereof, said seat member having a central passage therethrough aligned with the axis of said sleeve and boss, a valve needle member in the chamber thus defined within said sleeve between said pilot member and said seat member, said needle member having an elongated conical portion with an acute apex angle seated in the inner end of said passage in said seat member and a conical skirt portion entirely within such chamber of greater apex angle, an axial pilot boss on said needle member opposed to said boss on said pilot member, and a unitary compression spring member interposed between said needle member and said pilot member having integral cylindrical end portions closely fitting said respective pilot bosses, said spring member comprising a plurality of spring coils joined to said end portions at uniformly circumferentially spaced points to ensure compression and extension without tendency to cant.

3. A variable area metering valve comprising an outer body member having a large bore and a smaller aligned passage therethrough forming a shoulder therebetween, an inner sleeve secured in such bore and itself having a true cylindrical bore, a valve pilot member seated against said shoulder and having a peripheral flange tightly held between the inner end of said sleeve and said shoulder, a passage through said pilot member placing the interior of said sleeve and said passage in said body member in communication for fluid through-flow, a valve seat member fitted in said sleeve adjacent the outer end thereof, said seat member having a central passage therethrough aligned with the axis of said sleeve, a valve member in the chamber thus defined within said sleeve between said pilot member and said seat member, said valve member seating in the inner end of said passage in said seat member to close the same, a unitary compression spring member interposed between said valve member and pilot member having integral circumferentially continuous end portions respectively axially interengaging said valve member and pilot member, said spring member comprising a plurality of spring coils joined to said end portions at uniformly circumferentially spaced points to ensure compression and extension without tendency to cant said valve member being rigid with the end portion of said spring member engaged thereby.

References Cited in the file of this patent

UNITED STATES PATENTS

| 122,756 | Camerer | Jan. 16, 1872 |
| 604,326 | Horbiger | May 17, 1898 |
| 1,675,760 | Manzel | July 3, 1928 |
| 1,677,056 | Small | July 10, 1928 |
| 1,886,205 | Lyford | Nov. 1, 1932 |
| 2,197,271 | Kerrick | Apr. 16, 1940 |
| 2,343,079 | Pickwell | Feb. 29, 1944 |
| 2,524,129 | Klein | Oct. 3, 1950 |
| 2,606,066 | Thompson | Aug. 5, 1952 |
| 2,676,461 | Gove | Apr. 27, 1954 |
| 2,771,093 | Wilson | Nov. 20, 1956 |

FOREIGN PATENTS

| 265,907 | Italy | of 1929 |